United States Patent
Dignimont et al.

(10) Patent No.: US 12,067,811 B2
(45) Date of Patent: Aug. 20, 2024

(54) SYSTEM FOR SECURE TRANSFER OF DIGITAL AIRCRAFT DATA COMPRISING REDUNDANT DATA PRODUCER SYSTEMS, RELATED ASSEMBLY AND METHOD

(71) Applicant: DASSAULT AVIATION, Paris (FR)

(72) Inventors: Patrick Dignimont, Saint Cloud (FR); Jérôme Cappelle, Saint Cloud (FR); Serge Bruillot, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 74 days.

(21) Appl. No.: 17/574,644

(22) Filed: Jan. 13, 2022

(65) Prior Publication Data
US 2022/0222980 A1     Jul. 14, 2022

(30) Foreign Application Priority Data

Jan. 13, 2021 (FR) .................................. 21 00286

(51) Int. Cl.
*G07C 5/00*     (2006.01)
*B64D 45/00*   (2006.01)
*B64D 47/00*   (2006.01)
*G07C 5/08*     (2006.01)

(52) U.S. Cl.
CPC ............. *G07C 5/008* (2013.01); *B64D 45/00* (2013.01); *B64D 47/00* (2013.01); *G07C 5/0841* (2013.01); *B64D 2045/0085* (2013.01)

(58) Field of Classification Search
CPC ....... G07C 5/008; G07C 5/0841; B64D 45/00
See application file for complete search history.

(56) References Cited

U.S. PATENT DOCUMENTS 5,170,401 A * 12/1992 Mohr .................... H04L 1/242
                                                              714/821
2006/0015500 A1   1/2006 Heiden
2013/0208630 A1   8/2013 Bobrek
2015/0148996 A1   5/2015 Mere et al.
(Continued)

FOREIGN PATENT DOCUMENTS

FR            3013929 A1    5/2015
FR            3029619 A1    6/2016
WO       WO0008823 A1    2/2000

OTHER PUBLICATIONS

Search Report for priority application FR 2100286.
(Continued)

*Primary Examiner* — Hongmin Fan
(74) *Attorney, Agent, or Firm* — Davidson, Davidson & Kappel, LLC

(57) ABSTRACT

A system for secure transfer of digital aircraft data comprising redundant data producer systems includes a first data producer, capable of producing first data, at successive moments, and a second data producer, redundant to the first system. The second data producer is capable of producing an integrity check result relating at least to second data which it produces in a manner redundant to the first data, the integrity check result being transmitted to a data consumer. The data consumer is capable of retrieving the first data and the integrity check result produced by the second system, to produce a new integrity check result from the first data and compare the new integrity check result with the integrity check result produced by the second system.

19 Claims, 5 Drawing Sheets

(56) References Cited

U.S. PATENT DOCUMENTS

2016/0163202 A1    6/2016  Marion et al.
2018/0329780 A1*  11/2018  Boettjer ................ G06F 11/187
2019/0155325 A1*  5/2019  Lee ..................... G06F 11/1683

OTHER PUBLICATIONS

"Avionic Data Bus Integration Technology", Dec. 1, 1991, URL:http://www.tc.faa.gov/its/worldpac/techrpt/ct91-19.pdf.
Abaco Systems: "AFDX/ARINC 664 Protocol—White Paper", White Papers of Abaco Systems, Jan. 1, 2016, URL:https://www.abaco.com/system/files/files/afdx-arinc_664_protocol_a-wp-604a.pdf.

* cited by examiner

SYSTEM FOR SECURE TRANSFER OF DIGITAL AIRCRAFT DATA COMPRISING REDUNDANT DATA PRODUCER SYSTEMS, RELATED ASSEMBLY AND METHOD

The present disclosure relates to an aircraft data transfer system, comprising:

- a first data producer system capable of producing first data at successive moments;
- a second data producer system, redundant and preferably synchronous with the first data producer system, the second data producer system being capable of producing second data, advantageously at successive moments, intended to be identical to the first data;
- at least one data consumer system capable of receiving and using the first data;
- with at least one of the first or second data producer system and the or each data consumer system being installed in an aircraft;
- a data transfer link between the first data producer system and the or each data consumer system, the first data producer system being capable of transferring the first data to the or each data consumer system via the data transfer link.

The data transfer system is intended to ensure secure transfer of digital data within an aircraft, from the aircraft to at least one data consumer system external to the aircraft (such as at least one other aircraft, a ground control station in the case of a UAV, etc.), and/or from a data producer system external to the aircraft (such as another aircraft, a mission preparation system, a data download system, etc.) to the aircraft.

It is intended to be used in particular between data producer systems and one or more data consumer systems located at a distance from each other. The data transfer system can also be used within the same aircraft system, in particular between different computers of the same aircraft system, between an application producing equipment (such as a sensor) and one or more computers, between several application layers of the same computer, or between different cores of the same processor.

The transfer system is intended to be implemented independently of the number of digital data transfer links between each data producer system and each data consumer system and independently of the nature of these links in the overall data transmission architecture.

BACKGROUND

In an aircraft, many aircraft systems are capable of producing functional data. This is the case with systems for measuring sensor parameters, for example, with the parameters internal or external to the aircraft or avionics systems, in particular aircraft piloting, control or guidance systems.

The functional data is aircraft parameter measurements, aircraft system control commands or aircraft systems monitoring data, for example.

The functional data is often used by other aircraft systems, or by other application layers of the same aircraft system. They are therefore transferred between a data producer system and at least one data consumer system that may be located remotely, or even outside the aircraft or in other application layers.

Digital data transfer protocols are widely used within aircraft.

Some "low-level" protocols transmit digital data in the form of data words, each of which contains protocol management and functional information. This is the case with the ARINC 429 protocol, for example.

More advanced protocols, such as the GAM-T-101 protocol (Digibus), the MIL-STD-1553B protocol, or the Ethernet protocol and its so-called deterministic derivatives (ARINC664 Part 7 or SAE AS6802 or TSN) implement messages that enable the atomic transmission of several data words, some of which contain exclusively protocol management information and others exclusively functional information.

In all cases, ensuring the integrity of the transmitted data is essential in the aeronautical field.

In the example of the ARINC 429 protocol, the functional data is transmitted as a sequence of bits via ARINC429 words, whose size is limited to 32 bits.

Each ARINC 429 word includes a data identifier (ID) called a label, an identifier of the source that issued the data (SDI), the functional data (D), and a validity identifier of the data issued by the producing system (SSM).

The ARINC 429 protocol facilitates the transmission of so-called functional data in the form of data labeling and, in the following, as commonly used, "label" may refer to the full ARINC 429 word.

To verify functional data integrity after transmission, each ARINC 429 word also includes a parity check bit (P), resulting from the binary sum of the functional data bits. The parity bit is calculated when encoding the data into ARINC 429 words in the data transmission layer.

When recovering the data contained within an ARINC 429 word, the consuming system is able to recalculate the parity of the functional data it receives and verify that it is identical to the parity bit contained in the ARINC 429 word.

Nevertheless, this integrity test is often an insufficient indicator for seeing an integrity loss in functional data packet during the transfer.

Thus, if two bits of the functional data packet are erroneous, the sum may yield a parity corresponding to that of the check bit, while the functional data packet has been doubly corrupted.

Such a protocol can therefore be used when the data being transmitted is less important or not critical to the safety and operation of the aircraft.

If the data is important or critical, it is necessary to use redundant producing systems that elaborate data in parallel and transmit them in parallel to one or more consuming systems. The consuming system(s) receive(s) the data from the different producing systems and applies selection or voting strategies to ensure data integrity. Such a solution is safe, but increases the cost and complexity of the aircraft.

Indeed, the presence of at least two redundant producing systems associated with at least two redundant transfer links increases the infrastructure required within the aircraft, and thus the mass and cost.

Without redundancy, the transfer system would be simplified and less expensive, but the data integrity requirement would not be met.

SUMMARY

One object of the present disclosure is to provide an aircraft data transfer system with simplified structure, at a reduced cost, while ensuring data integrity in the event that the erroneous data could have catastrophic consequences.

To this end, the present disclosure provides a data transfer system as defined above, where the second data producer system is capable of producing an integrity check result relating at least to the second data, the integrity check result being intended to be transmitted to the or each data consumer system, with the or each data consumer system being capable of retrieving the first data transferred from the first data producer system and the integrity check result produced by the second data producer system, the or each data consumer system being capable of checking the integrity of the first data by establishing a new integrity check result from the first data and by comparing the new integrity check result with the integrity check result produced by the second data producer system The system according to the present disclosure may include one or more of the following features, taken alone or in any technically feasible combination:
- the data capsule has an integrity state when the new integrity check result matches the integrity check result produced by the second data producer system and retrieved from the data capsule;
- the first data is functional data, the second data being functional data;
- the second data producer system is incapable of transferring the second data directly to the or each data consumer system;
- the second data producer system is capable of transmitting the integrity check result for the second data to the first data producer system;
- the first data producer system is capable of transferring the integrity check result from the second data producer system through the data transfer link;
- the data transfer link exclusively connects the first data producer system to the or each each data consumer system, with no data transfer link connecting the second data producer system to the or each data consumer system;
- the second data producer system is incapable of directly the second data transferring to the or each data consumer system without passing through the first data producer system;
- the first data producer system is capable of producing a data capsule, at each data production, with each data capsule comprising:
  - an identifier of the data producer, a refresh indicator, updated at each data production, possibly a first functional data packet produced by the first data producer system; and
  - the result of the integrity check of the data produced by the second data producer system, the or each data consumer system being capable of recovering each data capsule in order to extract the identifier, the refresh indicator, possibly the first functional data packet produced by the first data producer system, and the integrity check result produced by the second data producer system;
- the second data producer system is capable of producing an identifier of the data producer, for each data production, intended to be identical to the identifier produced by the first data producer system, a refresh indicator, varying for each data production, intended to be identical to the refresh indicator produced by the first data producer system, with the integrity check result calculated from the identifier of the data producer, the refresh indicator and possibly the second functional data produced by the second data producer system;
- the transfer link implements a word producing transfer protocol, with each data capsule being transmitted by using a plurality of words;
- the plurality of words contains at least one identification word comprising the identifier and/or the refresh indicator, optionally at least one functional data word containing first functional data of the functional data packet, and at least one integrity check word, containing the integrity check result produced by the second data producer system;
- the second data producer system is capable of producing the integrity check result by adopting a memory representation from the data to be distributed in the words intended for transferring the data capsule, with the or each data consumer system capable of reconstituting the memory representation produced by the data producer system from the data recovered from the data capsule words; and
- the integrity check result is a checksum or cyclic redundancy code.

An assembly of aircraft data producer systems is also provided comprising:
- a first data producer system, capable of producing first data, at successive moments;
- a second data producer system, redundant and preferably synchronous with the first data producer system, the second data producer system being capable of producing second data, advantageously at successive moments, intended to be identical to the first data
- the first data producer system being capable of transferring the first data to at least one data consumer system via a data transfer link;
- characterized in that the second data producer system is capable of producing an integrity check result relating to the second data, the integrity check result intended to be transmitted to the or each data consumer system, and the second data producer system advantageously capable of transmitting the integrity check result to the first data producer system.

The present disclosure also relates to a data consumer system intended to be used in an aircraft data transfer system, the data transfer system comprising a first data producer system capable of producing first data at successive moments, and a second data producer system, redundant and preferably synchronous with the first data producer system, the second data producer system capable of producing second data intended to be identical to the first data, advantageously at successive moments, the or each data consumer system being capable of recovering the first data transferred from the first data producer system and an integrity check result produced by the second producing system relating to the second data, the or each data consumer system being capable of checking the integrity of the first data by establishing a new integrity check result from at least the first data and by comparing the new integrity check result with the integrity check result produced by the second data producer system The present disclosure also relates to an aircraft data transfer method comprising the following steps:
- producing first data by a first data producer system, at successive moments;
- producing second data intended to be identical to the first data, advantageously at successive moments, by a second data producer system, redundant and preferably synchronous with the first data producer system;
- transferring the first data via a data transfer link between the first data producer system and the or each data consumer system;
- at least one data consumer system receiving and using the first data;

at least one of the first data producer system, the second data producer system, and the or each data consumer system being on board an aircraft;
  characterized by the following steps:
    the second data producer system producing an integrity check result for the second data;
    transferring the integrity check result to the or each data consumer system; and
    the or each data consumer system retrieving the first data transferred from the first data producer system and the integrity check result produced by the second data producer system;
    the or each data consumer system integrity checking the first data by establishing a new integrity check result from at least the first data, comparing the new integrity check result to the integrity check result produced by the second data producer system.

The method according to the present disclosure may comprise one or more of the following features, taken alone or in any technically possible combination:
  the first data produced by the first data producer system and the integrity check result produced by the second data producer system are transmitted through the data transfer link, wherein the second data produced by the second data producer system is not transmitted directly to the or each data consumer system without transiting the first data producer system;
  the first data producer system produces a data capsule each time data is produced, with each data capsule comprising:
    an identifier of the data producer, a refresh indicator updated with each data production, possibly a packet of first functional data, produced by the first data producer system; and
    the data integrity check result produced by the second data producer system,
  the method comprising retrieval by the or each data consumer system of each data capsule to extract the identifier, the refresh indicator, optionally the first functional data packet produced by the first data producer system and the integrity check result produced by the second data producer system.

BRIEF DESCRIPTION OF THE DRAWINGS

The present disclosure will be better understood upon reading the following description, given only by way of example, and made with reference to the appended drawings, in which.

DETAILED DESCRIPTION

Figure 1:
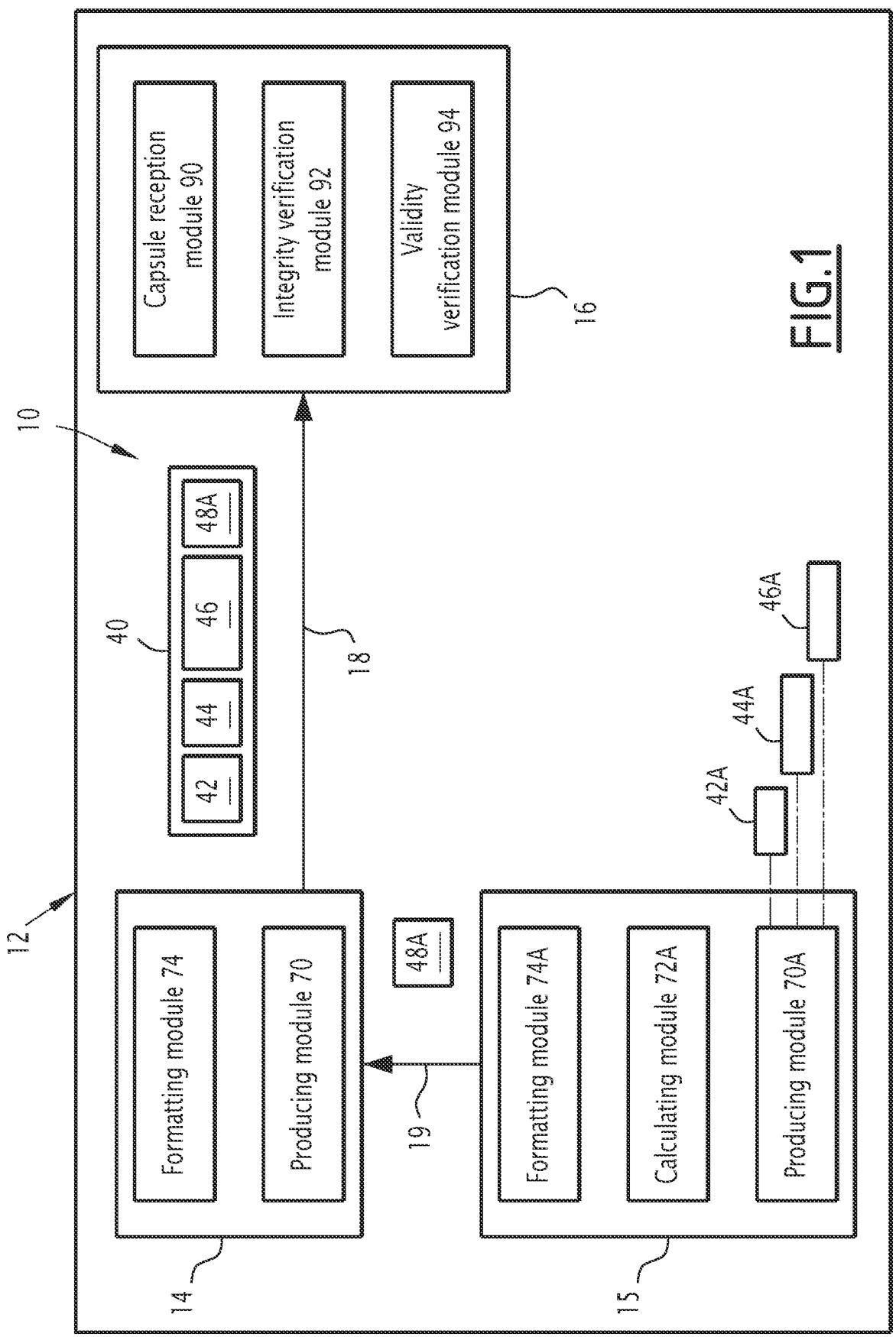
FIG. 1 is a schematic representation of an aircraft data transfer system according to the present disclosure.

A first data transfer system 10 according to the present disclosure within an aircraft 12 is illustrated schematically in FIG. 1.

The aircraft 12 is a business aircraft, a military aircraft, a passenger or cargo aircraft, or aerial drone vehicle, for example.

The data transferred by the system 10 is functional data produced or received in the aircraft, such as results of physical measurements of aircraft sensors, control command data of aircraft systems, status tracking data of aircraft systems or avionics data.

This functional data is transported and encoded in binary form as bit strings.

With reference to FIG. 1, the transfer system 10 includes a first data producer system 14, a second data producer system 15, redundant to the first data producer system 14, and at least one data consumer system 16.

The transfer system 10 further includes a data transfer link 18 between the producing system 14 and the or each consuming system 16. It also includes a secondary link 19 between the first data producer system 14 and the second data producer system 15, this link being a data transfer link between the first data producer system 14 and the second data producer system 15, for example, or a data read link from the second data producer system 15 by the first data producer system 14.

The data producer systems 14, 15 and the consuming system 16 are present in two respective separate aircraft systems of the aircraft 12, for example. The data transfer link 18 is then a transmission link present in the aircraft 12, such as a physical data transmission link through a cable network.

In a variant, at least one data consumer system 16 is external to the aircraft 12, located in another aircraft, for example, a ground control station in the case of a UAV, etc.

In another variant, at least one data producer system 14, 15 is external to the aircraft 12. It is located in another aircraft, for example, in a mission preparation system, in a data downloading system.

In the latter two cases, the data transfer link 18 includes at least one wireless data transmission link from the aircraft 12 and/or to the aircraft 12.

The data producer systems 14, 15 and the data consumer system 16 then each comprise at least one computing resource consisting of a processor and a memory containing software modules capable of execution by the processor.

In a variant, the systems 14, 15, 16 are made at least partially in the form of programmable logic components, or in the form of dedicated integrated circuits.

In one variant (not shown), the data producer systems 14, 15 and the data consumer system 16 are located within the same aircraft system, or the data producer systems 14 and 15 are even located together in the same aircraft system's computing resource at two separate application layers of the same aircraft computing resource, for example, or in two different cores of the same processor.

The first data producer system 14 is capable of producing first functional data at successive moments by producing them itself or by receiving them from one or several functional data sources. It is thus able to form a first functional data packet 46 at each successive data production moment.

The first data producer system 14 is also capable of producing a data capsule identifier 42 and a refresh indicator 44, updated by the data producer system 14 each time first functional data is produced, independently of the data transmission frequency in the transfer link 18.

The second data producer system 15 is redundant and preferably synchronous with the first data producer system 14. It is capable of producing second functional data at the same successive moments as the first functional data by producing them itself or by receiving them from the same functional data source(s) as the one(s) connected to the first data producer system 14. It is thus capable of forming a second functional data packet 46A, intended to be identical to the first functional data packet 46, at each successive data production moment in normal operation.

The second data producer system 15 is furthermore capable of producing a capsule identifier 42A intended to be identical to the capsule identifier 42 produced by the first data producer system 14, and a refresh indicator 44A, intended to be identical to the refresh indicator 44 produced by the first data producer system 14 each time first functional data is produced.

In addition, the second data producer system 15 is capable of producing an integrity check result, calculated from the identifier 42A and the refresh indicator 44A that it has produced, and from the second functional data packet 46A.

In the example shown in FIG. 1, the integrity check result 48A produced by the second data producer system 15 is transferred from the second data producer system 15 to the first data producer system 14 through the secondary transfer link 19.

Figure 2:
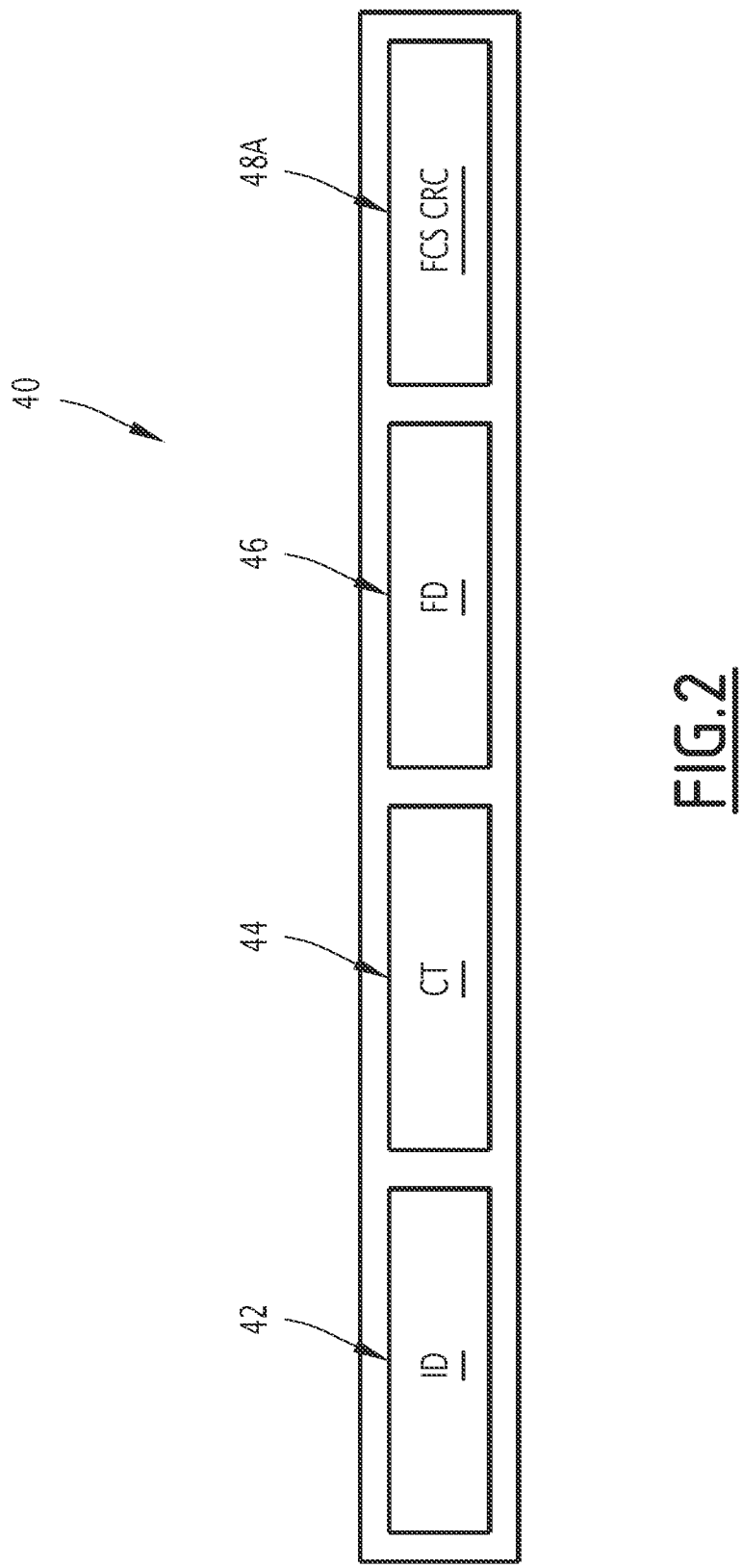
FIG. 2 is a schematic representation of the contents of a capsule used to transfer data within the transfer system of FIG. 1.
Figure 3:
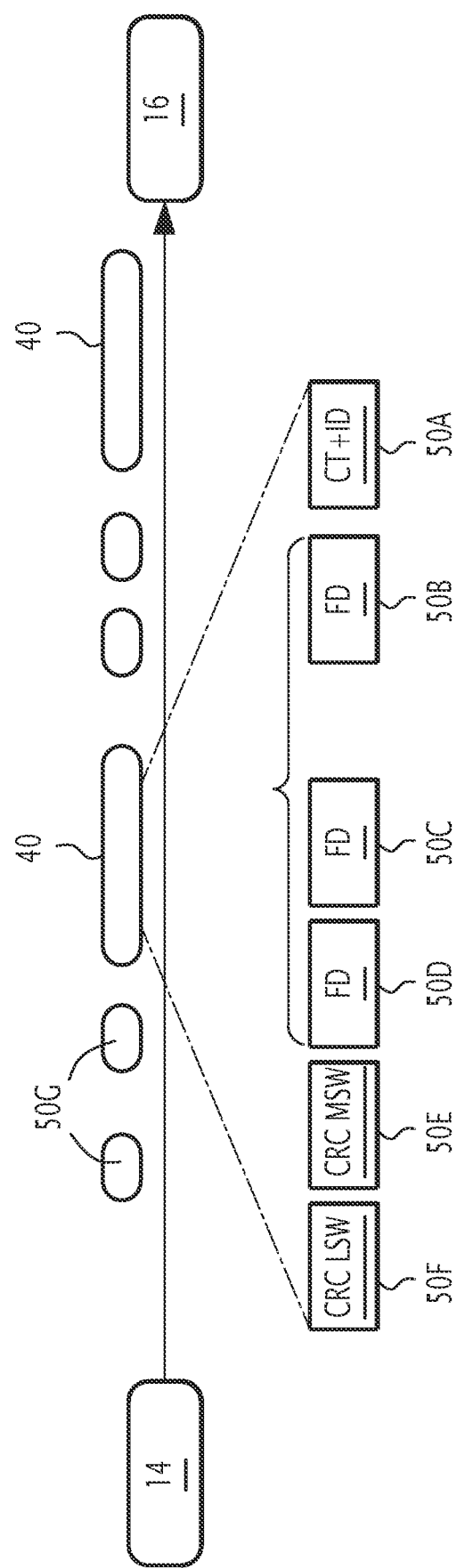
FIG. 3 is a schematic representation showing the structure of a capsule transmitted via a transmission protocol using words, in an example where the identifier and the refresh indicator are placed in the same word.

The first data producer system 14 is then capable of transmitting the produced data to the data consumer system 16 through the transfer link 18, encapsulating the first functional data 46 produced at successive moments in successive capsules 40, the content and structure of which are illustrated in FIGS. 1 to 3 respectively.

As illustrated in FIG. 2, each capsule 40 includes the capsule identifier 42 produced by the first data producer system 14, a refresh indicator 44, updated by the first data producer system 14 at each producing of functional data, independent of the data transmission frequency in the transfer link 18, and a first functional data packet 46 produced by the first data producer system 14 during a functional data production.

According to the present disclosure, each capsule 40 further includes an integrity check result 48A computed by the second data producer system 15 from the capsule identifier 42A produced by the second data producer system 15, from the refresh indicator 44A produced by the second data producer system 15, and from the second functional data packet 46A produced by the second data producer system 15 simultaneously with the first functional data packet 46.

The capsule identifier 42, 42A is a bit string for identifying the data producer system 14, 15, for example, and/or an entity that produced the functional data within the data producer system 14, 15. In particular, the capsule identifier 42, 42A allows the or each data consumer system 16 to identify the data producer and functional content of the data packet, based on predefined semantics and/or a mapping table, and thus implement an authentication check to ensure that the data was indeed produced by the expected data producer system 14, 15.

The capsule identifier 42 makes it possible to bijectively associate the capsule 40 to a given transfer system 10 (implemented in an aircraft 12, multiple aircraft, one or more aircraft, and means external to the aircraft 12), regardless of the number of transfer links 18 and the nature of those links in the overall transmission architecture.

It is thus possible, from the capsule identifier 42 associated with the capsule 40, based on predefined semantics and/or a mapping table, to assign the capsule 40 to a given transfer system 10 including data producer systems 14, 15 and at least one data consumer system 16.

Further, if the capsules 40 produced by the data producer system 14, 15 and/or an entity within the data producer system 14, 15 are all of identical structures, the data consumer system 16 is capable of identifying the position of the data packet 46 within the capsule 40, the length of the data packet 46 and the position of the integrity check result 48A, from the capsule identifier 42.

The refresh indicator 44, 44A is a bit string encoding a functional data production order number at each functional data production. The refresh indicator 44, 44A is a counter or countdown, for example, generally updated individually at each functional data production. It makes it possible to associate a data refresh measurement to each transmitted capsule 40. This measurement makes it possible to ensure that the functional data retrieved by the data consumer system 16 has been refreshed by the data producer system 14, 15, constituting a refresh control.

The data packet 46, 46A is a bit string encoding the functional data produced during the functional data production associate with the number of the refresh indicator 44, 44A.

The integrity check result 48A is a bit string encoding a check number calculated by mathematical processing, from a functional representation incorporating the identifier 42A, the refresh indicator 44A, and the second functional data 46A produced by the second data producer system 15.

Preferably, the integrity check result 48A is the result of a checksum, or cyclic redundancy code (CRC). The mathematical processing is an algorithm, for example, chosen based on the security objectives to be achieved, the minimum/maximum length of the data packet 46A, the identifier 42A, the refresh indicator 44A, and the reliability of the data link in terms of bit error rate (BER). Examples of the algorithms used are described in the United States Federal Aviation Administration document DOT/FA/TC-14/49, March 2015, available at:

https://www.faa.gov/aircraft/air_cert/design_approvals/air_software/media/TC-14-49.pdf.

In the example shown in FIG. 1, the data transfer link 18 is a link implementing a data transfer protocol using words 50 containing transmission protocol management information and functional information, as viewed from that protocol.

In a variant that will be described below, the data transfer link 18 is a link implementing a data transfer protocol using messages that make atomic transmission of multiple words 50 possible, some of which contain exclusively transmission protocol management information and others of which contain exclusively functional information, as seen from this protocol.

Figure 4:
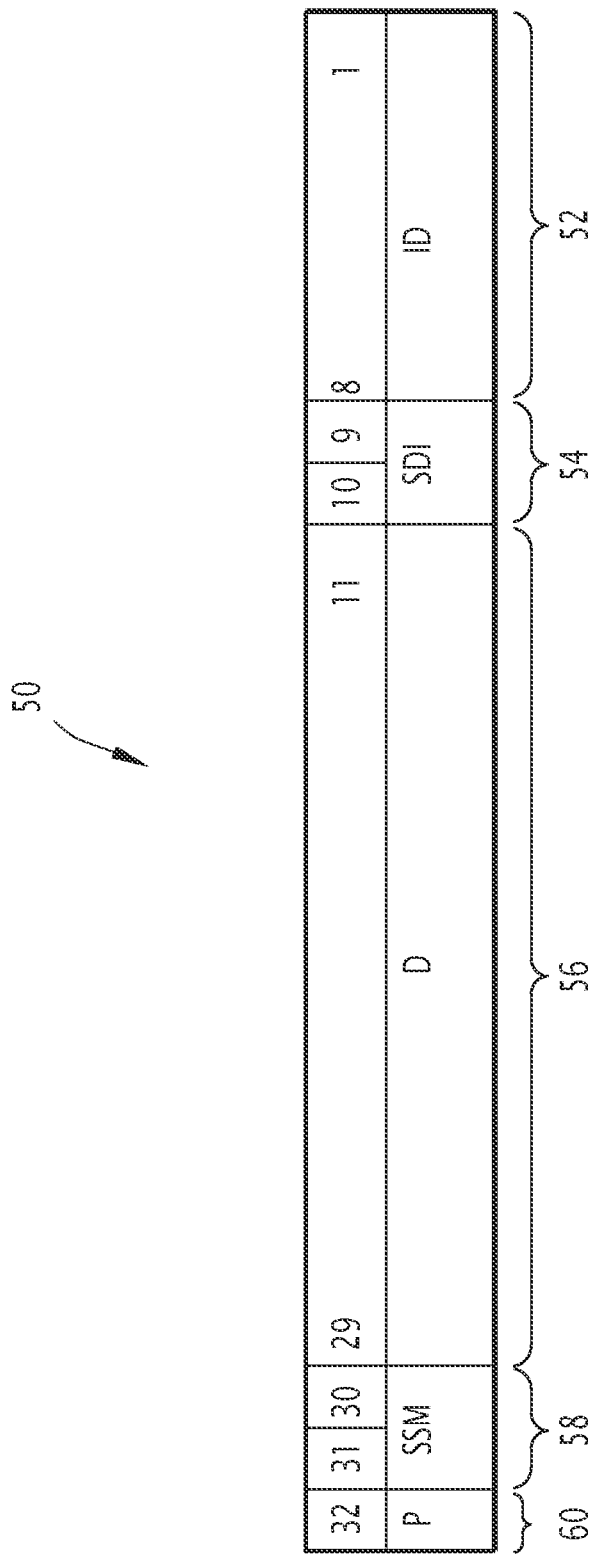
FIG. 4 is a detailed view of a word representation of the ARINC 429 protocol.

An example data transfer protocol using words 50 is shown in FIG. 4, which is advantageously implemented in an ARINC 429 link.

Each word 50 is defined by a bit sequence forming a word, having a predefined number of bits. The word 50 for ARINC 429, has thirty-two bits.

As explained above, it is commonly referred to as the "ARINC 429 word" or "label".

The word 50 is broken down into separate fields. In the example shown in FIG. 4, the word 50 includes a field 52 for identifying the word (ID), and advantageously, a field 54 for identifying the receiver and/or subsystem that transmitted the data (optional SDI field in the ARINC 429 standard). The word 50 also includes a field 56 containing the data (D) carried by the word, a data validity (SSM) or sign/sense field (e.g. +/− or North/South, East/West), and a parity field (P) 60.

Field 52 contains an identification of the word, with normalized semantics defined during word producing.

Field 54 (optional) is generally intended to define which data receiver is intended for the word, or which transmitter subsystem transmitted the data.

Field 56 contains the data to be transmitted by word 50. In this example it has nineteen bits.

Field 58 contains an identifier that may be used to identify the validity of the data produced by the data producer system 14, to identify whether the data producer system 14 considers the data to be valid or whether it considers it to be no longer valid.

The parity field 60 is a binary sum calculation of all bits in the fields 52, 54, 56, and 58 to determine the parity of the sum.

In the case where the transfer link 18 is a link implementing the words 50, the capsule size 40 is generally larger than the field size 56 of the data carried by a word 50.

As illustrated in FIG. 3, the capsule 40 is thus transmitted over a plurality of distinct words 50A through 50F by distributing the identifier 42, refresh indicator 44, functional data 46, and integrity check result 48A into the fields 56 of multiple words 50A through 50F.

Preferably, at least a first identification word 50A contains the identifier 42 of the capsule 40 and/or the refresh indicator 44. Advantageously, the word 50A contains both the identifier 42 of the capsule 40, and the refresh indicator 44.

In order to limit the bandwidth consumed, the identifier 42 of the capsule 40 is preferably formed by the field 52 identifying the word 50A, and by the field 54 identifying the receiver and/or the subsystem that transmitted the data. This is possible by establishing a mapping table between each capsule 40 and the successive identifiers of the words 50A to 50F used to transmit the capsule 40.

For example, if each capsule 40 corresponding to a functional data production is issued in N words 50, the N successive identifiers of the N words 50 are associated with the capsule 40.

The refresh indicator 40 is encoded in binary form in the field 56 of the word 50A, using 16 of the 19 bits available in the field 56, for example.

In a variant (not shown), the word 50A contains the identifier 42 of the capsule 40, in field 56, for example, and another identification word (not shown) separate from the word 50A contains the refresh indicator 44 in the field 56.

Depending on the size of the functional data packet 46 produced at each functional data production, the functional data packet 46 is issued on at least one functional data word 50B through 50D, typically on multiple functional data words 50B through 50D.

The data in the functional data packet 46 is distributed over the fields 56 of the one or more functional data words 50B through 50D that contain only functional data.

The functional data words 50B through 50D do not contain the refresh indicator 44 or the result of the integrity test 48A. The identifier of each word 50B through 50D identifies to which capsule 40 the functional data contained in field 56 of word 50B through 50D belongs.

The integrity check result 48A of each capsule 40 is issued on at least one integrity check word 50E, 50F, advantageously on two integrity check words 50E, 50F, when it contains thirty-two bits, while the field 56 of each word 50E, 50F contains only 19 bits.

The capsule 40 thus created is then transferred via the transfer link 18 by spreading it over several words 50A through 50F, to accommodate the transfer protocol present in the aircraft 12.

To this end, with reference to FIG. 1, the first data producer system 14, includes a module 70 for producing functional data 46 and associating it with a capsule identifier 42 40 and with a refresh indicator 44, and a module 74 for formatting the data for transfer via the transfer link 18

The second data producer system 15, includes a module 70A for producing second functional data 46A for association with an identifier 42A and with a refresh indicator 44A, the second functional data 46A, the identifier 42A and the refresh indicator 44A produced by the second data producer system 15 being intended to be identical to the respective first functional data 46, the identifier 42 and the refresh indicator 44 produced by the first data producer system 14 at each data production.

The second data producer system 15, further includes a module 72A for calculating an integrity check result 48A, established on the identifier 42A, the refresh indicator 44A, and the data packet 46A, at each functional data production, and a formatting module 74A for transferring the integrity check result 48A via the secondary transfer link 19.

The data production module 70, 70A is capable of producing functional data as defined above or retrieving functional data applicable to other aircraft systems via an application layer. The functional data is produced at successive moments, on request or at a predefined functional data production frequency.

The functional data is distinct from the transport data (such as word identifier) required to implement the transfer link 18.

The data production module 70, 70A is thus capable of creating a functional data packet 46, 46A at each data production, of generally identical size for each data production. It is capable of associating an identifier 42, 42A with each functional data packet 46, 46A produced, making it possible to identify the functional content of the functional data packet 46, 46A, its producer, and the membership of the functional data packet 46, 46A to a capsule 40, using the mapping table.

As noted above, the identifier 42, 42A further advantageously defines the size of the capsule 40, the size of the data packet 46, 46A, and the position of the integrity checksum 48A, using the mapping table.

The data production module 70 is further capable of relating a refresh indicator 44, 44A to each functional data production, independently of the transmission frequency via the link 18. The refresh indicator 44, 44A ensures that the data transmitted via the transfer link 18 is indeed valid data that has been refreshed. The refresh indicator 44, 44A is coded on a determined number of bits, between 1 and 32, for example.

In the case of an incremental counter, the refresh indicator 44, 44A is capable of resetting to null when the refresh indicator maximum has been reached.

The integrity check result calculation module 72A is capable of building a memory representation 80 of the identifier 42A, the refresh indicator 44A, and the data packet 46A at the application layer, independent of the transport layers. An example of a memory representation 80 is shown in FIG. 5, which corresponds to a transport in the form of words 50.

Figure 5:
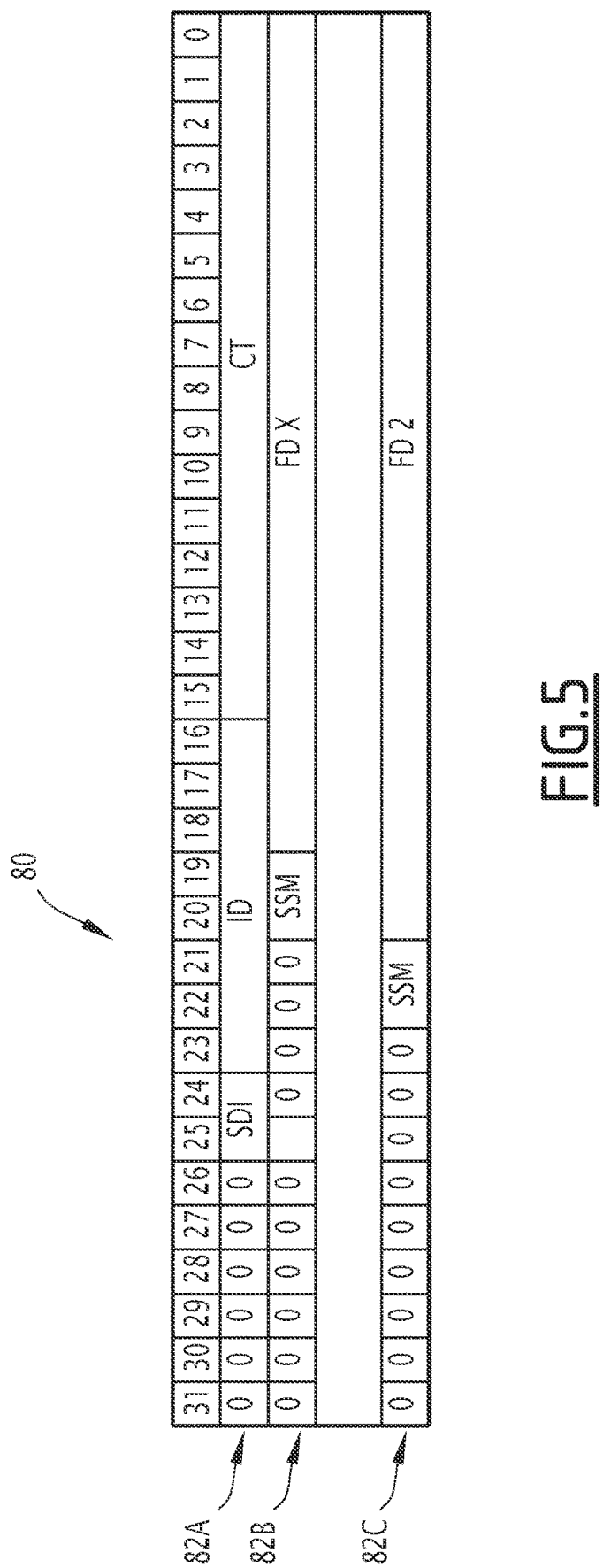
FIG. 5 is a view of a memory representation of a sequence of words forming a capsule, in order to implement an integrity test.

With reference to FIG. 5, the bits intended for the identifier and/or refresh indicator word 50A and the data words 50B through 50D on which the capsule 40 is transmitted are distributed as rows, with each row corresponding to a word (ARINC 429 word, for example, in the case of an ARINC 429 link) in a table having a number of columns corresponding to the number of bits in each word.

The bits specific to the transmission protocol in each word 50A through 50D are intentionally forced to a selected bit, such as a null bit, in the memory representation 80.

For example, in the first row 82A of the table in the memory representation 80 corresponding to the identifier and/or refresh indicator word 50A, only the bits for the identifier 42A and the refresh indicator 44A are retained at their value. The same is true for each functional data transport word 50B to 50D corresponding to the lines 82B to 82D, in which the bits corresponding to the word identifier, the SDI field, and the parity calculation, are voluntarily forced to a chosen bit, a null bit in this case.

Only the functional data 46A, the identifier 42A, and the refresh indicator 44A are retained in the memory representation 80.

Thus, the memory representation 80 makes it possible to test the integrity of the identifier 42 and refresh indicator 44 from the first data producer system 14 received by the data consumer system 16, through the first line 82A of the representation, representing the identifier 42A and refresh indicator 44A produced by the second data producer system. The memory representation 80 also tests the integrity of the functional data packet 46 originating from the first data producer system 14 and received by the data consumer system 16, through the distribution of the second functional data packet 46A on the lines 82B through 82D, incorporating the data validity fields 58.

Once this memory representation 80 is constructed, the integrity result calculator module 72A is capable of implementing a checksum calculation and/or cyclic redundancy code, as defined above.

For example, to ensure good reliability of the integrity check, the integrity calculation result 48A is obtained by a MIL-STD-1760 checksum, or by a CRC-32K/6.4 cyclic redundancy code. The check result is encoded as thirty-two bits, in this example.

The formatting module 74A of the second data producer system 15 is then capable of transmitting the integrity check result 48A to the first data producer system 14, advantageously in the form of a plurality of words 50, as previously described, but not necessarily.

The formatting module 74 of the first data producer system 14 is then capable of emitting each capsule 40 corresponding to a functional data production, in the form of a plurality of words 50A to 50F, as described previously.

In particular in the case of an ARINC 429 type link, the identifiers of the words 50A to 50F corresponding to a given capsule 40 are advantageously produced according to predefined semantics, so that if the words 50A to 50F are transmitted in disorder, or if other words 50G not belonging to the capsule 40 are interposed between the words 50A to 50F of the capsule 40 in a discontinuous manner, the capsule 40 can be reconstituted by the data consumer system 16 based on the predefined semantics.

The data consumer system 16 includes a module 90 for receiving and producing each capsule 40, a module for verifying the integrity 92 of the capsule 40, and a module 94 for verifying the validity of the data of the capsule 40.

The capsule reception module 90 is capable of reconstituting each capsule 40, in particular by identifying the various words 50A to 50F of the capsule 40 received via the transfer link 18 via their identification field 52.

Once the capsule 40 is reconstituted, it is capable of extracting the identifier 42, the refresh indicator 44 and the data packet 46 corresponding to the capsule 40.

The capsule reception module 90 is capable of performing an authentication check of the data producer system 14 by verifying whether the received data really comes from the expected data producer system 14, from the identifier 42.

Also from the capsule identifier 42, and in the case of a capsule 40 of fixed size, the capsule reception module 90, with the help of the same mapping table as that of the data producer system 14, is capable of knowing the size of the capsule 40 and the position of the refresh indicator 44, the functional data packet 46 and the integrity check result 48A within the capsule 40.

The integrity verification module 92 is capable of reconstructing the same memory representation 80 as that constructed by the second data producer system 15, from the data retrieved from the capsule 40 that was transferred over the transfer link 18.

It is capable of applying the same algorithm as that implemented by the integrity result calculation module 72A of the second data producer system 15 to calculate a new integrity check result for the received data, including the identifier 42, the refresh indicator 44 and the first functional data packet 46 produced by the first data producer system 14 and transferred via the transfer link 18.

The integrity verification module 92 is capable of determining that the capsule 40 comprising the identifier 42, the refresh indicator 44 and the data packet 46 is in an integrity state if the new integrity check result calculated from the received data is identical to the integrity check result 48A calculated by the second data producer system 15, extracted from the capsule 40.

It is capable of determining that the capsule 40, including the identifier 42, the refresh indicator 44 and the data packet 46 is in a corrupted state if the new integrity check result calculated from the received data is different from the integrity check result 48A calculated by the second data producer system 15.

Thus, it is not necessary for the first data producer system 14 to produce an integrity check result itself, nor is it necessary for the identifier 42A, refresh indicator 44A, and data packet 46A produced by the second data producer system 15 to be transmitted to the data consumer system 16.

Any difference between the functional data 46, 46A, the identifiers 42, 42A, and the refresh indicators 44, 44A produced by the first data producer system 14 and the second data producer system 15 is detectable, since the new integrity check result computed by the data consumer system 16 is then different from the integrity check result 48A computed by the second data producer system 15.

Similarly, any data corruption during transfer on the transfer link 18 or on the secondary transfer link 19 will be detectable, as the new integrity check result calculated by the data consumer system 16 is also different from the integrity check result 48A calculated by the second data producer system 15.

This highly reliable integrity detection is achieved without having to provide full data transfer redundancy between the data producer systems 14, 15 and the data consumer system. Only one transfer link 18 is required for at least two data producer systems 14, 15, which reduces the physical lines on the aircraft without affecting bandwidth.

Once the integrity of the refresh indicator 44 has been confirmed, the validity verification module 94 is capable of evaluating the data refresh contained in the capsule 40 by performing a refresh check based on the refresh indicator 44.

To this end, it is capable of comparing the refresh indicator 44 of each received capsule 40 with the refresh indicator 44 received from a previous capsule 40 to verify that the refresh indicator 44 has refreshed, by being incremented or decremented, for example, or followed an expected refresh trend.

The validity verification module 94 is capable of calculating the refresh increment between the refresh indicator 44 of the received capsule 40 and the refresh indicator 44 of the capsule 40 received just before, for example.

In particular in the case of a counter or countdown, if the increment is unitary in absolute value, the validity verification module 94 is capable of determining that the functional data present in the capsule 40 is indeed refreshed data and for placing the capsule 40 in an expected refresh state.

In the case of a frequency of transmission via the link 18 or of the data acquisition by the data consumer system 16 that is higher than the producing frequency of the functional data by the data producer system 14, the validity verification module 94 is capable of authorizing a null refresh increment on a determined number of capsules 40, calculated depending on the frequencies of producing, transmission or acquisition of the capsules 40, for example.

Beyond the determined number of capsules 40, if the refresh indicator 44 remains identical, it is capable of passing the capsule 40 into an inadequate refresh state, because its data have not been refreshed.

Furthermore, when the production and/or transmission frequency of the capsules 40 is higher than the acquisition frequency of the capsules 40, the validity verification module 94 is capable of authorizing a refresh indicator increment higher than one.

In any case, the validity verification module 94 is capable of memorizing the refresh indicator of each capsule 40 just received, to make an increment calculation possible when the next capsule 40 is received.

It is also capable of taking into account the setting to null of the refresh indicator 44, when the latter reaches its maximum value.

Thus, depending on the increment calculated between the refresh indicators 44 of two successive capsules 40, the validity verification module 94 is capable of determining the functional data present in the capsule 40 are indeed refreshed data that can be used by the consuming system 16, and to place the capsule 40 in an expected refresh state. If, in contrast, the data is not refreshed or lacks intermediate data that has not been received, it is capable of placing the capsule 40 in an inadequate refresh state.

When the capsule 40 originates from the expected data producer system 14, 15 is in the integrity state and in the expected refresh state, the functional data contained therein is considered valid and is then capable of use by the consuming system 16, or for transmission to another aircraft system for use.

When a capsule 40 does not originate from the expected data producer system 14, or is in the corrupted state or an inadequate refresh state, the validity check module 94 is capable of excluding the data from the capsule 40, which is considered invalid.

The validity check module 94 is advantageously capable of implementing a reset phase during a given reset time, corresponding to the reinitialization of a computer or a transient failure ending, for example.

In this case, as soon as a new capsule 40 is received, originating from the expected data producer system 14 and being in the integrity state, the validity verification module 94 is capable of memorizing the new value of the refresh indicator 44 of this capsule 40. Then, it is capable of retrieving the refresh indicator 40 of each new capsule 40 arriving, to determine a refresh increment. If the refresh increment reflects an expected refresh state, the validity check module 94 is capable of switching the capsules 40 back to the valid state, after the predefined reset time.

In some cases, if the integrity or refresh failure affecting the data contained in the capsules 40 is varied, i.e. it occurs regularly or arbitrarily, the validity check module 94 is capable of permanently stopping the reset and declaring the data transfer system 10 to be in default.

In operation, through their functional data production modules 70, 70A, the first data producer system 14 and the second data producer system 15 simultaneously produce a capsule identifier 42, 42A, a refresh indicator 44, 44A updated at each functional data production regardless of the data transmission frequency in the transfer link 18 and a functional data packet 46, 46A. The second functional data 46A, the identifier 42A, and the refresh indicator 44A produced by the second data producer system 15, in normal operation, are intended to be identical to the first functional data 46, the identifier 42, and the refresh indicator 44 produced by the first data producer system 14 at each respective data production.

Then, the integrity check result calculation module 72A of the second data producer system 15 elaborates a memory representation 80 of the identifier 42A, the refresh indicator 44A and the data packet 46A. It then implements a checksum calculation and/or cyclic redundancy code as defined above, on the memory representation 80, to obtain an integrity check result 48A.

The formatting module 74A of the second data producer system 15 then transmits the integrity check result 48A to the first data producer system 14 via the secondary transfer link 19.

The formatting module 74 of the first data producer system 14 then issues each capsule 40 corresponding to a functional data production, preferably in the form of a plurality of words 50A through 50F, as previously described.

The capsule 40 includes the capsule identifier 42 produced by the first data producer system 14, the refresh indicator 44, updated by the first data producer system 14 at each functional data production regardless of the data transmission frequency in the transfer link 18, and the first functional data packet 46 produced by the first data producer system 14 in a functional data production.

The capsule 40 further includes an integrity check result 48A computed by the second data producer system 15, as discussed above.

After the capsule 40 is received by the capsule receiving module 90, the integrity verification module 92 reconstructs the same memory representation 80 as that constructed by the second data producer system 15, from the data retrieved from the capsule 40 that was transferred over the transfer link 18.

It applies the same algorithm as that implemented by the integrity result calculation module 72A of the second data producer system 15 and calculates a new integrity check result on the received data, including the identifier 42, the refresh indicator 44 and the first functional data packet 46 produced by the first data producer system 14 and transferred via the transfer link 18.

The integrity verification module 92 then determines that the capsule 40 comprising the identifier 42, the refresh indicator 44, and the data packet 46 is in an integrity state if the new integrity check result calculated from the received data is identical to the integrity check result 48A calculated by the second data producer system 15, extracted from the capsule 40.

It determines that the capsule 40 comprising the identifier 42, the refresh indicator 44, and the data packet 46 is in a corrupted state if the new integrity check result it calculated from the received data is different from the integrity check result 48A calculated by the second data producer system 15 extracted from the capsule 40.

In a variant, the second data producer system 15 prepares a second capsule 40A containing the identifier 42A, the refresh indicator 44A, the second functional data 46A and the integrity check result 48A. This second capsule is transferred via the data link 19 to the first data producer system 14. The data producer system 14 then transmits the capsules 40 and 40A via the data link 18 to the data consumer system 16.

In this case, the data consumer system 16 performs the aforementioned checks on the capsules 40 and 40A, and then compares each data item in the capsule 40 with the corresponding data item in capsule 40A, to ensure that they are consistent (threshold comparison, for example).

If so, the consistent data can be used by the data consumer system 16.

In a variant, not shown, the capsule 40 is transmitted through a transmission protocol using messages consisting of a plurality of consecutive words 50, typically transmitted in atomic form, one after the other.

Generally, at least one word 50 of each message just contains information for managing the transmission protocol. The capsule 40 is then distributed over several words 50 of the same message containing no transmission protocol management information, unlike the protocol described above, in which each word 50 contains transmission protocol management information.

One or more words of the same message then contain the capsule identifier 42 and the refresh indicator 44, one or more words of the same message contain the functional data 46, and one or more words of the same message contain the integrity check result 48A, calculated from the identifier 42, refresh indicator 44 and data packet 46 of the capsule 40.

In another variant (not shown), each capsule 40 is distributed across a plurality of messages by distributing capsule identifier 42, refresh indicator 44, functional data 46, and integrity check result 48 across words of the plurality of messages.

In another variant (not shown), the capsule 40 lacks any functional data 46. The capsule 40, as such, comprising the capsule identifier 42, the refresh indicator 44, and the integrity check result 48A on the identifier 42A and on the refresh indicator 44A is then the equivalent of a signal for triggering or validating an action. The data transmitted by the capsule 40 is then the presence of the capsule 40, or not.

What is claimed is:

1. An aircraft data transfer system, comprising:
   a first data producer configured to produce first data at successive moments;
   a second data producer redundant with the first data producer, the second data producer being configured to produce second data, identical to the first data;
   at least one data consumer configured to receive and use the first data;
   at least one of the first data producer, the second data producer and the at least one data consumer being on board an aircraft; and
   a data transfer link between the first data producer and the at least one data consumer, the first data producer being configured to transfer the first data to the at least one data consumer via the data transfer link;
   the second data producer being configured to produce an integrity check result relating to at least the second data, to be transmitted to the at least one data consumer,
   the at least one data consumer being configured to retrieve the first data transferred from the first data producer and the integrity check result produced by the second producer, the at least one data consumer being configured of checking the integrity of the first data by establishing a new integrity check result from the first data and by comparing the new integrity check result with the integrity check result produced by the second data producer.

2. The transfer system according to claim 1, wherein the second data producer is configured to transmit the integrity check result relating to the second data to the first data producer.

3. The transfer system according to claim 2, wherein the first data producer is configured to transfer the integrity check result from the second data producer through the data transfer link.

4. The transfer system according to claim 2, wherein the data transfer link exclusively connects the first data producer to the at least one data consumer, and no data transfer link connects the second data producer to the at least one data consumer.

5. The transfer system according to claim 2, wherein the second data producer is incapable of transferring the second data directly to the at least one data consumer without passing through the first data producer.

6. The transfer system according to claim 1, wherein the first data producer is configured to produce a data capsule at each data production, each data capsule comprising:
   a data producer identifier;
   a refresh indicator updated at each data production produced by the first data producer; and
   the integrity check result of the data produced by the second data producer,
   the at least one data consumer being configured to recover each data capsule to extract the identifier, the refresh indicator produced by the first data producer and the integrity check result produced by the second data producer.

7. The transfer system according to claim 6, wherein each data capsule comprises a first functional data packet, produced by the first data producer, the at least one data consumer being configured to recover each data capsule to extract the first functional data packet produced by the first data producer.

8. The transfer system according to claim 6, wherein the second data producer is configured to produce, at each data production, a data producer identifier intended to be identical to the identifier produced by the first data producer, a refresh indicator, varying at each data production, the integrity check result being calculated from the data producer identifier and the refresh indicator produced by the second data producer.

9. The transfer system according to claim 8, wherein the second data producer is configured to produce, at each data production, second functional data, the integrity check result being calculated from the data producer identifier, the refresh indicator and from the second functional data, produced by the second data producer.

10. The transfer system according to claim 6, wherein the transfer link implements a word-producing transfer protocol, each data capsule being issued using a plurality of words.

11. The transfer system according to claim 10, wherein the plurality of words comprise at least one identification word, comprising the identifier and/or the refresh indicator, and at least one integrity check word, containing the integrity check result produced by the second data producer.

12. The transfer system according to claim 11, wherein the plurality of words comprises at least one functional data word containing first functional data of the functional data packet.

13. The transfer system according to claim 6, wherein the second data producer is configured to produce the integrity check result by adopting a memory representation from the data to be distributed in words intended to transfer the data capsule, the at least one data consumer being capable of reconstituting the memory representation produced by the data producer from the data recovered from the words of the data capsule.

14. The transfer system according to claim 1, wherein the integrity check result is a checksum or a cyclic redundancy code.

15. The transfer system according to claim 1, wherein the second data producer is synchronous with the first data producer.

16. A data consumer configured to be used in an aircraft data transfer system, the data transfer system comprising:
  a first data producer configured to produce first data at successive moments; and
  a second data producer redundant with the first data producer, the second data producer being configured to produce second data identical to the first data,
  the at least one data consumer being configured to recover the first data transferred from the first data producer and an integrity check result produced by the second producer relating to the second data, the at least one data consumer being configured to check the integrity of the first data, by establishing a new integrity check result from at least the first data and by comparing the new integrity check result with the integrity check result produced by the second data producer.

17. A method for transferring aircraft data comprising:
  producing first data at successive moments, via a first data producer;
  producing second data identical to the first data, via a second data producer, redundant with the first data producer;
  transferring the first data via a data transfer link between the first data producer and at least one data consumer;
  receiving and using the first data via at least one data consumer,
  at least one of the first data producer, the second data producer, and the at least one data consumer being on board an aircraft;
  producing an integrity check result for the second data via the second data producer;
  transferring the integrity check result to the at least one data consumer;
  retrieving the first data transferred from the first data producer and the integrity check result produced by the second data producer via the at least one data consumer; and
  integrity checking the first data via the at least one data consumer by establishing a new integrity check result from at least the first data and comparing the new integrity check result to the integrity check result produced by the second data producer.

18. The method according to claim 17, wherein the first data produced by the first data producer and the integrity check result produced by the second data producer are transmitted through the data transfer link, wherein the second data produced by the second data producer is not transmitted directly to the at least one data consumer without passing through the first data producer.

19. The method according to claim 18, wherein the first data producer produces a data capsule, at each data production, each data capsule comprising:
  a data producer identifier;
  a refresh indicator updated at each data production, produced by the first data producer; and
  the data integrity check result produced by the second data producer,
  the method comprising retrieving each data capsule via the at least one data consumer to extract the identifier, the refresh indicator, produced by the first data producer and the integrity check result produced by the second data producer.

* * * * *